United States Patent [19]

Bryers et al.

[11] 4,240,364
[45] Dec. 23, 1980

[54] FLUIDIZED BED START-UP APPARATUS AND METHOD

[75] Inventors: Richard W. Bryers, Flemington; Thomas E. Taylor, Bergenfield, both of N.J.

[73] Assignee: Foster Wheeler Energy Corporation, Livingston, N.J.

[21] Appl. No.: 35,618

[22] Filed: May 3, 1979

Related U.S. Application Data

[62] Division of Ser. No. 866,985, Jan. 5, 1978, Pat. No. 4,184,438.

[51] Int. Cl.³ .............................................. F23D 19/02
[52] U.S. Cl. .................................. 110/347; 110/263; 110/245; 122/4 D
[58] Field of Search ............... 122/4 D; 431/7, 6, 170; 110/264, 263, 245, 347; 432/58

[56] References Cited

U.S. PATENT DOCUMENTS

| | | | |
|---|---|---|---|
| 2,976,853 | 3/1961 | Hunter et al. | 110/264 X |
| 3,387,590 | 6/1968 | Bishop | 122/4 D |
| 3,983,931 | 10/1976 | Whitehead et al. | 122/4 D X |
| 4,171,945 | 10/1979 | Lazenby | 431/170 |

Primary Examiner—Edward G. Favors
Attorney, Agent, or Firm—Marvin A. Naigur; John E. Wilson; Warren B. Kice

[57] ABSTRACT

An apparatus and method for supporting and starting up a fluidized bed in which a grate is disposed in a housing for receiving a single bed of particulate material, portions of which are combustible. The interior of the housing below the grate is divided into a plurality of compartments, and an air damper is disposed in each for selectively controlling the flow of air through the compartments and through the respective portions of the grate to selectively fluidize the corresponding portions of the bed of particulate material. A start-up burner is provided for igniting that portion of the combustible portion of the bed of particulate material extending above one of the compartments and additional combustible particulate material is selectively supplied to the portions of the bed.

6 Claims, 1 Drawing Figure

U.S. Patent
Dec. 23, 1980
4,240,364
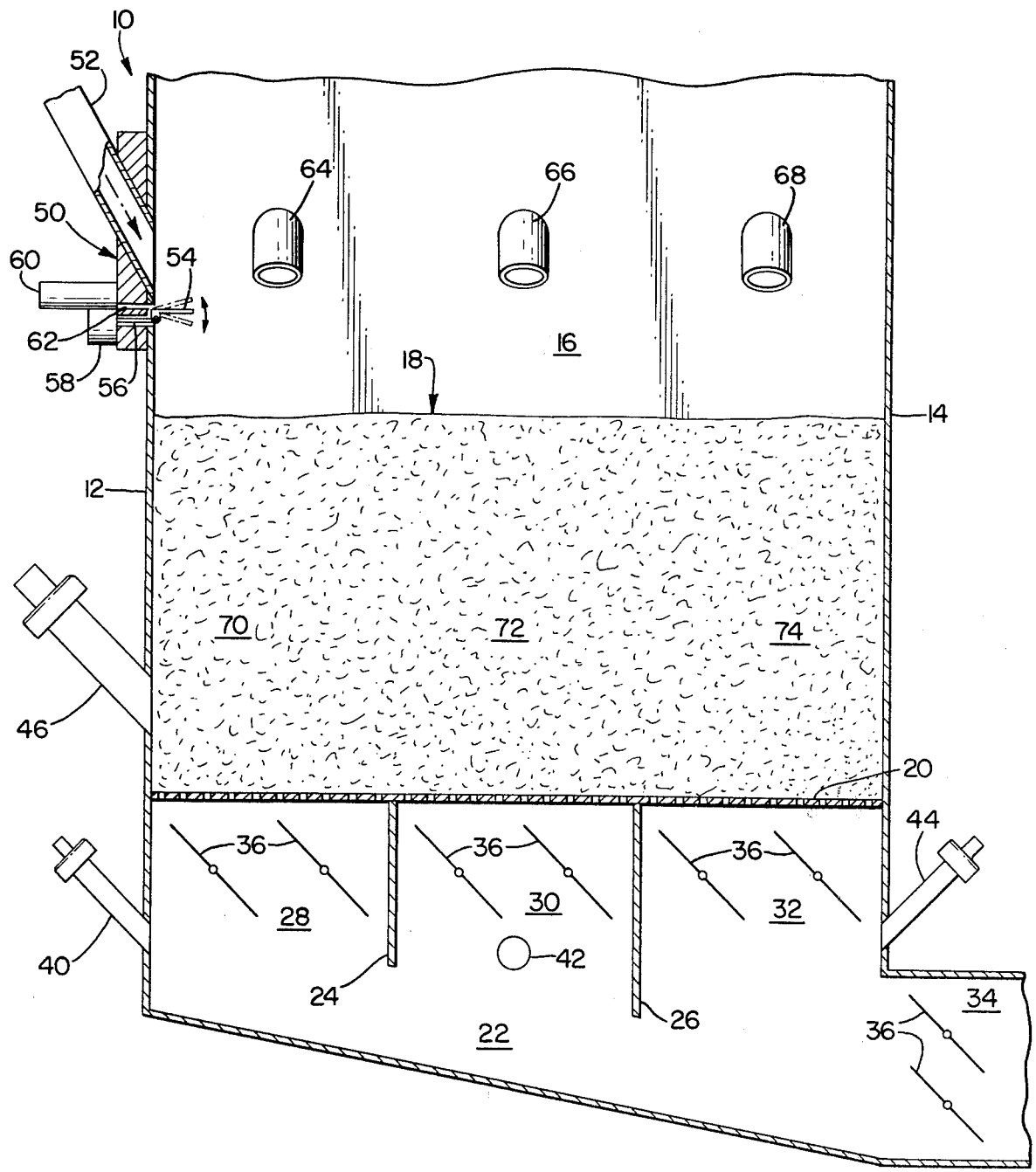

FLUIDIZED BED START-UP APPARATUS AND METHOD

This application is a division, of application Ser. No. 866,985, filed Jan. 5, 1978, now U.S. Pat. No. 4,184,438.

BACKGROUND OF THE INVENTION

The present invention relates to fluidized beds, and more particularly to a method and apparatus for supporting and starting a fluidized bed.

The use of fluidized beds has been recognized as an attractive means of generating heat. In these arrangements, air is passed through a bed of particulate material, which normally consists of a mixture of inert material and a fossil fuel such as coal, to fluidize the bed and to promote the combustion of the fuel. When the heat produced by the fluidized bed is utilized to convert water to steam, such as in a steam generator, the fluidized bed system offers an attractive combination of high heat release, improved heat transfer to surfaces within the bed, and compact boiler size.

When a fluidized bed boiler is activated after a period of idle time, the bed material must be heated above the fuel ignition temperature before operation can begin. However, the mass of material involved makes simultaneous start-up of the entire bed expensive and inefficient, especially with regard to relatively large beds. Although several techniques have been suggested for starting a fluidized bed they each provide less than optimum solutions. For example, since coal is difficult to burn in a fluidized bed until the bed is raised to a relatively high temperature, the use of external burners or the like to heat the bed to the coal burning temperature often takes several hours and is inefficient with respect to fuel use. Also, it has been suggested to preheat the beds with the use of hot flames directed onto the top surface of the bed. However, the high temperatures resulting from the application of the direct flames can injure the particles or the boiler structure. It has also been suggested to provide physical partitions within the beds to divide the bed into a plurality of smaller beds, and start up the entire bed by sequentially starting up each individual bed. However, the use of these partitions considerably adds to the cost of the system.

SUMMARY OF THE INVENTION

It is therefore an object of the present invention to provide a method and apparatus for starting up a fluidized bed which is relatively simple, efficient, and low in cost.

It is a further object of the present invention to provide a method and apparatus of the above type which reduces the chance of injury to the bed particles and boiler structure in addition to eliminating the cost involved in dividing the bed into a plurality of smaller beds.

Toward the fulfillment of these and other objects the apparatus of the present invention comprises a housing, a grate supported in the housing and adapted to receive on its upper surface a single bed of particulate material at least a portion of which is combustible. Partitions are provided for dividing the interior of the housing below the grate into a plurality of compartments. A plurality of air dampers are respectively associated with the compartments for selectively controlling the flow of air through each compartment and through the respective portions of the grate extending over the compartments to selectively fluidize the corresponding portion of the bed of particulate material. Burners extend in the housing for heating and igniting that portion of the combustible portion of the bed of particulate material extending above one of the compartments, and combustible particulate material is selectively supplied to the portions of the bed of particulate material.

BRIEF DESCRIPTION OF THE DRAWING

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawing which is a vertical sectional view of the apparatus of the present invention.

DESCRIPTION OF THE PREFERRED EMBODIMENT

Referring to the drawing, the reference numeral 10 refers in general to a fluidized bed boiler of the present invention consisting of a front wall 12, a rear wall 14, and two side walls, one of which is shown by the reference numeral 16. The upper portion of the boiler is not shown for the convenience of presentation, it being understood that it consists of a convection section, a roof and an outlet for allowing the combustion gases to discharge from the boiler, in a conventional manner.

A bed of particulate material, shown in general by the reference numeral 18, is disposed within the boiler 10 and rests on a perforated grate 20 extending horizontally in the lower portion of the boiler. The bed 18 can consist of a mixture of discrete particles of inert material and fuel material such as bituminous coal.

An air plenum chamber 22 is provided immediately below the grate 20 and a pair of partitions 24 and 26 divide the upper portion of the chamber 22 into three compartments 28, 30, and 32. An air inlet 34 is provided through the rear wall 14 in communication with the chamber 22 for distributing air from an external source (not shown) to the chamber.

A pair of air dampers 36 are provided in the inlet 34, and in each of the compartments 28, 30, and 32 for controlling the flow of air into the chamber and through the compartments. The dampers 36 are suitably mounted in the inlet 34 and in the compartments 28, 30, and 32 for pivotal movement about their centers in response to actuation of external controls (not shown) to vary the effective openings in the inlet and the compartments and thus control the flow of air through the inlet and the compartments. Since these dampers are of a conventional design they will not be described in any further detail.

Three air preheat burners 40, 42, and 44 are mounted through the front wall 12, the side wall 16 and the rear wall 14, respectively, and communicate with the chambers 28, 30, and 32, respectively, for preheating the air flowing through the compartments. A bed light-off burner 46 is mounted through the front wall 12 immediately above the grate 20 for initially lighting off a portion of the bed 18 during start-up. The details of the operations of the burners 40, 42, 44, and 46 will be described later.

A distributor, shown in general by the reference numeral 50, is mounted relative to the upper portion of the front wall 12 and operates to distribute particulate fuel material, such as coal, into selected portions of the bed 18 during start-up. A pneumatic spreader is used for example, however, the distributor could also be mechanical. The distributor 50 includes a inlet pipe 52 for receiving the coal and feeding same, by gravity onto a distributor tray 54 which extends into the interior of the boiler 10. The tray 54 is pivotally mounted relative to a actuating lever 56 for controlling the movement of the tray between the positions shown by the solid lines and the two positions shown by the dashed lines. A control for the pivotal movement of the tray 54 is shown in general by the reference numeral 58 and can be of any conventional type. The distributor 50 also includes an air distributor unit, shown in general by the reference numeral 60 for distributing air at a selected rate through a plurality of vanes, one of which is shown by the reference numeral 62, to inject the air across the coal on the tray 54. As a result the coal is distributed into portions of the interior of the boiler 10 that are determined by the position of the tray 54.

A plurality of feeders 64, 66, and 68 are provided through the side wall 16 immediately above the bed 18 at spaced intervals which correspond to the spacing between the compartments 28, 30, and 32 in the air chamber 22. The feeders 64, 66, and 68 also are adapted to introduce and feed particulate coal to the bed 18.

As a result of the location of the compartments 28, 30, and 32 and the feeders 64, 66, and 68, the bed 18 is effectively separated into three portions shown in general by the reference numerals 70, 72, and 74, respectively for reasons that will be set forth in detail later.

To start-up the bed 18, the dampers 36 associated with the air inlet 34 and the dampers 36 associated with the compartment 28 are opened, while the dampers 36 associated with compartments 30 and 32 are closed. Air is thus distributed upwardly through the compartment 28 and through the perforations in the grate 20 immediately above the compartment 28 and into the bed portion 70. This loosens the particulate material in the bed portion 70 and reduces material packing and bridging.

The dampers 36 associated with the compartment 28 are then closed and the dampers 36 associated with the compartment 30 are opened to introduce air into the bed portion 72 in a manner similar to that discussed above. The dampers 36 associated with the compartment 30 are then closed and the dampers 36 associated with the compartment 32 are opened to repeat the process with respect to the bed portion 74.

The dampers 36 associated with the compartment 32 are then closed and the dampers 36 associated with the compartment 28 are opened and the air preheat burner 40 is fired. The air thus passes through the compartment 28, and is thereby preheated before it passes upwardly through the bed portion 70, with the flow rate of the preheated air being controlled to permit fluidization of the bed portion without substantial material elutriation.

When the temperature of the bed portion 70 reaches a predetermined value, such as 250°-300° F., the light-off burner 46 is fired to further heat the material in the bed portion 70. When the temperature of the bed portion 70 reaches a predetermined higher lever, such as 800°-950° F., the distributor 50 is activated in a manner to move the tray 54 to its lowermost position as shown by the dashed lines, and to turn on the air distributor 60 to distribute the particulate fuel from the inlet pipe 52 into the upper portion of the bed portion 70.

When the fluidized bed portion 70 reaches a further elevated predetermined temperature, such as 1200° F., the dampers 36 associated with the compartment 30 are opened and the air preheat burner 42 is fired so that the bed portion 72 is fluidized with preheated air. Due to presence of the preheated air, and the lateral mixing of the bed portion 72 with the bed portion 70, the temperature of the bed portion 72 will rise rapidly and, when it reaches approximately 800°-900° F., the position of the tray 54 of the distributor 50 will be adjusted to include distribution of the particulate coal to the upper portion of the bed portion 72 in addition to the bed portion 70, as described above. When the fluidized bed portion 72 reaches the predetermined elevated temperature, which in the above example is 1200° F., the bed portion 74 is fluidized by opening the dampers 36 associated with the compartment 32 and firing the air preheat burner 44. The position of the tray 54 is then adjusted so that the particulate coal is also distributed to the bed portion 74.

After all three of the beds have been fluidized and have reached the predetermined elevated temperature of 1200° F. in the foregoing manner, the air preheaters 40, 42, and 44, as well as the light-off burner 46 are turned off and the individual feeders 64, 66, and 68 extending immediately above the bed portions 70, 72, and 74, respectively, can be activated to distribute particulate fuel directly to the upper portion of these beds. When the these fluidized bed portions reach a final desired temperature, such as 1550° F., the relative precise control of the feed rate and accuracy of the distribution of the fuel material afforded by the distributor 50 is no longer needed, and the latter can be shut down and the final bed temperature can be controlled by controlling the rate of feed of the feeders 64, 66, and 68.

It is thus seen that the present invention provides an effective yet simple method of starting up a fluidized bed with a minimum of damage to the particulate material, while avoiding the costs associated with a partitioned type boiler.

It is understood that if the boiler is used for the purpose of steam generation, a plurality of heat exchange tubes carrying the fluid to be heated, such as water, will be routed through the interior of the boiler in a conventional manner with these tubes being omitted in the drawing for the convenience of presentation.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method for starting a fluidized bed, comprising the steps of supporting a bed of particulate material at least a portion of which is combustible, dividing the area below said bed into a plurality of zones, selectively passing air through each zone and through the corresponding portions of said bed extending over said zones to selectively fluidize said bed portions, individually controlling the flow of air through each of said zones and therefore through said bed portions, preheating the air in each zone as it flows through said zones, igniting the combustible portion of the particulate material extending above one of said zones, and supplying additional combustible particulate material to said bed portions.

2. The method of claim 1 wherein said steps of supplying additional combustible particulate material to said bed portions comprises the steps of supplying combustible particulate material from a single source to said bed portions during start-up of said bed, and supplying combustible particulate material from individual sources extending over said zones to said portions of said bed after start-up of said bed.

3. The method of claim 1 further comprising the step of repeating said air passing step, the first air passing step being for the purpose of reducing material packing and material bridging and the second air passing step being done in conjunction with said step of preheating.

4. A method for starting a fluidized bed, comprising the steps of supporting a bed of particulate material at least a portion of which is combustible, selectively introducing the flow of air to successive portions of said bed of particulate material to selectively fluidize said portions of said bed of particulate material, igniting the combustible portion of one of said bed portions to start-up said bed, supplying additional combustible particulate material to said bed portions from a single source during start-up of said bed, and then supplying additional combustible particulate to said bed portions from a plurality of individual sources respectively associated with said bed portions after start-up of said bed.

5. The method of claim 4 further comprising the steps of individually controlling the flow of air through each of said zones and therefore through said bed portions.

6. The method of claim 4 further comprising the step of repeating said air passing step, the first air passing step being for the purpose of reducing material packing and material bridging and the second air passing step being done in conjunction with said step of preheating.

* * * * *